United States Patent
Narayanan Thangaraj et al.

(10) Patent No.: US 12,238,746 B2
(45) Date of Patent: Feb. 25, 2025

(54) MULTICAST AND BROADCAST SERVICES RELIABILITY INDICATION

(71) Applicant: InterDigital Patent Holdings, Inc., Wilmington, DE (US)

(72) Inventors: Yugeswar Deenoo Narayanan Thangaraj, Chalfont, PA (US); Oumer Teyeb, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 18/771,257

(22) Filed: Jul. 12, 2024

(65) Prior Publication Data

US 2024/0365349 A1 Oct. 31, 2024

Related U.S. Application Data

(63) Continuation of application No. 18/294,727, filed as application No. PCT/US2022/039122 on Aug. 2, 2022.

(Continued)

(51) Int. Cl.
*H04W 72/30* (2023.01)
*H04W 4/06* (2009.01)
(Continued)

(52) U.S. Cl.
CPC .............. *H04W 72/30* (2023.01); *H04W 4/06* (2013.01); *H04W 72/20* (2023.01); *H04W 72/542* (2023.01); *H04W 76/27* (2018.02)

(58) Field of Classification Search
CPC ... H04W 72/20; H04W 72/30; H04W 72/542; H04W 76/27; H04W 4/06
See application file for complete search history.

(56) References Cited

U.S. PATENT DOCUMENTS

| 2019/0037635 A1* | 1/2019 | Guo ................. H04W 76/27 |
| 2019/0380078 A1 | 12/2019 | Fujishiro et al. |

(Continued)

FOREIGN PATENT DOCUMENTS

| WO | 2018143413 A1 | 8/2018 |
| WO | 2021/126924 A1 | 6/2021 |

OTHER PUBLICATIONS

3rd Generation Partnership Project (3GPP), R2-2100960, "Control Plane for Delivery Mode 2 for NR MBS", TD Tech, Chengdu TD Tech, 3GPP TSG RAN WG2 Meeting #113-e, Electronic Meeting, Jan. 25-Feb. 5, 2021, 6 pages.

(Continued)

*Primary Examiner* — Rhonda L Murphy
(74) *Attorney, Agent, or Firm* — Condo Roccia Koptiw LLP

(57) ABSTRACT

Reliability monitoring and indication may be provided for multicast and broadcast services (MBS). A WTRU may receive an MBS configuration for an INACTIVE state (e.g., suspend PTP and maintain PTM for split MRB). MBS configuration and suspend configuration may be associated with different areas (e.g. MBS area versus RAN area). Configurations may indicate reliability indication triggers (e.g., polling, event-based, periodic), a reliability metric configuration, and/or a reliability indication configuration. A WTRU (e.g., in INACTIVE) may receive an MBS transmission (e.g., on MRB(s)), receive an MCCH (e.g., with trigger(s) for reliability indication during MCCH modification period), determine reliability metric(s) associated with MBS TB reception, monitor reliability metric(s) during time interval(s) for MCCH modification period(s), select RA resources (e.g., per mapping between resources and reliability metric value/range), indicate a reliability metric (e.g., transmit reliability indication via selected preamble and (Continued)

RO), and/or monitor RAR format responsive to the reliability indication transmission.

19 Claims, 6 Drawing Sheets

Related U.S. Application Data

(60) Provisional application No. 63/228,629, filed on Aug. 3, 2021.

(51) Int. Cl.
*H04W 72/20* (2023.01)
*H04W 72/542* (2023.01)
*H04W 76/27* (2018.01)

(56) References Cited

U.S. PATENT DOCUMENTS

2021/0410045 A1 12/2021 Kadiri et al.
2022/0303729 A1 9/2022 Xu et al.

OTHER PUBLICATIONS

3rd Generation Partnership Project (3GPP), R2-2104984, "On NR MBS Operation in Idle/Inactive Mode", Samsung, 3GPP TSG-RAN WG2 Meeting #114-e, Online, May 19-27, 2021, 8 pages.
3rd Generation Partnership Project (3GPP), TS 38.213 V16.1.0, "Technical Specification Group Radio Access Network, NR, Physical layer procedures for control (Release 16)", Mar. 2020, pp. 1-156.
3rd Generation Partnership Project (3GPP), TS 38.321 V16.1.0, "Technical Specification Group Radio Access Network, NR, Medium Access Control (MAC) Protocol Specification (Release 16)", Jul. 2020, pp. 1-151.
3rd Generation Partnership Project (3GPP), TS 38.322 V16.1.0, "Technical Specification Group Radio Access Network, NR, Radio Link Control (RLC) protocol specification (Release 16)", Jul. 2020, pp. 1-33.
3rd Generation Partnership Project (3GPP), TS 38.331 V16.1.0, "Technical Specification Group Radio Access Network, NR, Radio Resource Control (RRC) protocol specification (Release 16)", Jul. 2020, pp. 1-906.

* cited by examiner

MULTICAST AND BROADCAST SERVICES RELIABILITY INDICATION

CROSS-REFERENCE TO RELATED APPLICATIONS

This application is a continuation of U.S. patent application Ser. No. 18/294,727, filed Feb. 2, 2024, which is the National Stage Entry under 35 U.S.C. § 371 of Patent Cooperation Treaty Application No. PCT/US2022/039122, filed Aug. 2, 2022, which claims the benefit of Provisional U.S. Patent Application No. 63/228,629, filed Aug. 3, 2021, the contents of which are incorporated herein by reference in their entireties.

BACKGROUND

Mobile communications using wireless communication continue to evolve. A fifth generation of mobile communication radio access technology (RAT) may be referred to as 5G new radio (NR). A previous (legacy) generation of mobile communication RAT may be, for example, fourth generation (4G) long term evolution (LTE).

SUMMARY

Systems, methods, and instrumentalities are described herein associated with multicast and broadcast services (MBS) reliability indications.

Techniques associated with reliability monitoring and/or a reliability indication are disclosed (e.g., may be implemented by or in association with a wireless transmit/receive unit (WTRU)), for example, as described herein. The reliability indication may be an indication associated with transmission reliability, for example determined by a WTRU, e.g., based on whether the WTRU receives transmission(s) (e.g., MBS transmission(s), such as MBS transport block(s)). A reliability indication may include or indicate a reliability indicator (e.g., reliability metric) and/or a determined value and/or range of the reliability indicator. One or more of the following may apply.

A WTRU may receive MBS configuration information. The MBS configuration information may be associated with an INACTIVE state. For example, MBS configuration information may be received in a message (e.g., an RRC message, such as an RRC release message that includes a suspend configuration (e.g., SuspendConfig) indication, where SuspendConfig may be used as an example). The validity of the MBS configuration information and SuspendConfig indication may be associated with different areas (e.g., logical areas), where for example the logical areas may be an MBS area versus a radio access network (RAN) area. The MBS configuration information may include and/or indicate one or more of the following: multicast radio bearer (MRB) configuration information for an INACTIVE state; one or more triggers for a reliability indication; a reliability metric configuration; or a reliability indication configuration.

MRB configuration information for an INACTIVE state may indicate with one or more of the following. The WTRU may (e.g., in and/or on a condition of entering an INACTIVE state) suspend a point-to-point (PTP) leg and/or maintain a point-to-multipoint (PTM) leg for a split MRB, for example, if MBS reception is allowed in the INACTIVE state. The WTRU may keep one or more MBS bearers active after entering INACTIVE state. The WTRU may suspend other bearers (e.g., non-MBS bearers and/or the MBS bearers different than the one or more MBS bearers configured to be active in INACTIVE).

Triggers for a reliability indication may be associated with one or more of the following. A trigger for a reliability indication may indicate whether reliability monitoring and/or reliability indication is periodic, event triggered, polling based, and/or the like. One or more triggers for a reliability indication may be indicated, for example, in a polling configuration information, an event-based configuration information, and/or a periodic configuration information. Polling configuration information may be associated with a multicast control channel (MCCH). The polling configuration information associated with the MCCH may indicate to the WTRU to perform a reliability indication, for example for a specific MBS service, e.g., by signaling an identity associated with such MBS service. For example, the identity may be indicated by a group radio network identifier (GRNTI) associated with MBS service(s) for which the WTRU is expected to perform reliability monitoring. An event-based configuration information may indicate to perform a reliability indication, for example, if one or more thresholds associated with reliability metrics are satisfied, etc. A trigger to perform a reliability indication may be indicated in a periodic configuration, where for example a periodic configuration information may be received every n modification period, where n may be fractional or greater than or equal to (>=) one (1).

A reliability metric configuration information may be associated with one or more of the following. A reliability metric configuration information may include (e.g., indicate), for example, a type of reliability metric, which may include one or more of a statistic associated with an MBS channel quality indicator (CQI) and/or block error rate (BLER); a number of repetitions versus an expected (e.g., total) number of transmissions within an MCCH modification period; etc.

A reliability indication configuration information may be associated with one or more of the following. A reliability indication configuration information may indicate one or more resources for a reliability indication, which may include, for example, one or more of the following: one or more random access (RA) preambles; a random access channel (or procedure) (RACH) occasion (RO) (e.g., in relation to an MCCH modification boundary); an association between an RA resource and a reliability metric (e.g., or a range thereof); etc.

The WTRU may enter an INACTIVE state, for example, based on a command from a network (e.g., when receiving RRC release with suspendConfig). The WTRU (e.g., in the INACTIVE state) may receive an MBS transmission, e.g., on one or more configured MRBs.

The WTRU may receive an MCCH transmission. The MCCH transmission may include or indicate a polling request for a reliability indication. The MCCH transmission may be received and/or include the polling request in accordance with the GRNTI. The MCCH transmission may be received during a time interval (e.g., MCCH modification period n). Assistance information (e.g., additional assistance information) may be received for reliability monitoring. The assistance information may include, for example, an expected number of MBS transport blocks (TBs) within a modification period. An activation and/or a deactivation of a periodic reliability indication may be received, for example, via a medium access control (MAC) control element (CE).

The WTRU may determine one or more reliability metrics associated with a received MBS transmission (e.g., an MBS TB reception in the INACTIVE state).

The WTRU may monitor one or more reliability metrics, for example during a time interval such as a time interval associated with an MCCH modification period (e.g., MCCH modification period n+1).

The WTRU may determine a reliability indicator (e.g., reliability metric) and/or a value and/or range of the reliability indicator (e.g., reliability metric), for example based on a trigger condition being satisfied, such as a reception of a polling request or other condition described herein. The WTRU may select RA resource(s), for example based on the determined value and/or range of the reliability indicator (e.g., reliability metric), e.g., based on an association and/or mapping between one or more preconfigured resources and the determined value and/or range of the reliability metric.

The WTRU may indicate (e.g., implicitly indicate) the reliability metric and/or the value and/or range of the reliability metric. For example, the WTRU may transmit a reliability indication (e.g., a reliability indication may include or indicate the reliability indicator (e.g., reliability metric) and/or the determined value and/or range of the reliability indicator) via a selected preamble and an RO, where for example the selected preamble and RO may implicitly indicate the reliability metric.

The WTRU may monitor a random access response (RAR) format for a response associated with the reliability indication transmission (e.g., where the RAR format may be specific to the reliability indication transmission). An RAR format (e.g., a response in the RAR format) may include, for example, one or more of the following: an indication of whether the WTRU should perform a subsequent random access and resume procedure; an indication of whether the WTRU should perform a two-step RA (e.g., to provide additional WTRU-specific information, such as an inactive RNTI (I-RNTI) transmission); and/or an indication to go back to and/or stay in INACTIVE state.

FIG. 2 illustrates an example of reliability monitoring and reliability indication for MBS. A common reference period may be used for reliability indication (e.g., by a network and a WTRU). The common reference period may include a MCCH modification period. A MCCH modification period may include multiple slots. FIG. 2 shows two MCCH modification periods, MCCH modification period n and MCCH modification period n+1. During MCCH modification period n, multiple MCCH transmissions may be sent (e.g., by the network). Some or all of the MCCH transmissions may include the same information (e.g., same polling request). For example, the MCCH transmission may indicate the expected number of TBs to be sent (e.g., by the network) during the next MCCH modification period (e.g., MCCH modification period n+1). A WTRU may determine the number of TBs that are actually received and/or successfully decode, and determine a ratio of received TBs versus sent TBs using the expected number of TBs to be sent during the next MCCH modification period and using the number of TBs that are actually received. A value of the reliability indicator may include the ratio. A MCCH transmission may be sent for an (e.g., each) MCCH repetition period.

The MCCH transmission may indicate a polling request. For example, an (e.g., each) MCCH transmission may include a polling request (e.g., each MCCH transmission may include the same polling request). A WTRU may or may not successfully decode a MCCH transmission that indicates the polling request. If the WTRU successfully decodes the MCCH transmission, the WTRU, based on the reception of the polling request, may be triggered to measure one or more values of a reliability indicator. For example, the measurements of the one or more values of a reliability indicator may be based on information included in the MCCH transmission. During MCCH modification period n+1, multiple MCCH transmissions may be sent (e.g., by the network), for example, per repetition period. A MCCH transmission sent during MCCH modification period n+1 may include a polling request that, if successfully decoded, triggers measurements of one or more values of a reliability indicator during next MCCH modification period (e.g., MCCH modification period n+2). The WTRU may determine PRACH resources to send a preamble based on a determined value of the reliability indicator. As shown in FIG. 2, after the MCCH modification period n+1, the value of the reliability indicator may be indicated by sending the preamble using determined PRACH resources.

As an example, a WTRU may be configured to receive in an RRC CONNECTED state an MBS configuration associated with an RRC INACTIVE state. The MBS configuration may include one or more triggers for reliability indication, mapping between a range of reliability metric and UL resources for reliability metric indication. Upon entering RRC INACTIVE state, the WTRU may suspend the PTP leg (if any) and start or continue PTM leg for MBS services. The WTRU may monitor for one or more triggers for a MCCH transmission with a polling request for reliability indication. The polling request may be associated with a specific MBS bearer, provide assistance information e.g., the number of MBS transport blocks within the modification period n+1. The WTRU may determine a reliability metric during the time interval associated with MCCH modification period n+1, for example, the reliability metric may be ratio of number of successful MBS transport blocks received to total number of MBS transport blocks transmitted within a modification period. The WTRU may determine RA resource applicable for reliability indication as a function of reliability metric value. The WTRU may transmit RA preamble on the determined RA resource The WTRU may monitor for an RAR format associated with the reliability indication. Upon receiving an RAR matching the reliability indication, the WTRU may perform one or more following actions based on received RAR: performing another RA procedure to initiate a resume procedure or staying in RRC INACTIVE to receive MBS services.

A WTRU may be configured to receive RAN paging with reliability polling (e.g., instead of MCCH polling).

A WTRU may be configured to initiate a transition from INACTIVE to CONNECTED, for example, based on the value and/or range of the reliability metric being below a threshold.

Reliability monitoring may be performed over a shorter time scale, for example, based on a duration of time that may be tracked (e.g., via a timer). In examples, the shorter time scale may be a time period that is shorter than the length of a modification period (e.g., MCCH modification period). A duration of time may be tracked (e.g., timer may be started), for example, if/when a WTRU receives polling. The WTRU may transmit the reliability indication on the earliest RO, for example, based on expiration of the duration of time (e.g., expiration of the timer).

DETAILED DESCRIPTION

Systems, methods, and instrumentalities are described herein for multicast and broadcast services (MBS) reliability indications. A WTRU may receive an MBS configuration for an INACTIVE state (e.g., suspend point-to-point (PTP) and maintain point-to-multipoint (PTM) for a split multicast radio bearer (MRB)). MBS configuration and suspend configuration may be associated with different areas (e.g. MBS area versus radio access network (RAN) area). Configurations may indicate reliability indication triggers (e.g., polling, event-based, periodic), a reliability metric configuration, and/or a reliability indication configuration. A WTRU (e.g., in INACTIVE) may, for example, receive an MBS transmission (e.g., on MRB(s)), receive a multicast control channel (MCCH) (e.g., with trigger(s) for reliability indication during MCCH modification period), determine reliability metric(s) associated with MBS transport block (TB) reception, monitor reliability metric(s) during time interval(s) for MCCH modification period(s), select random access (RA) resources (e.g., per mapping between resources and reliability metric value/range), indicate a reliability metric (e.g., transmit reliability indication via selected preamble and random access channel (or procedure) (RACH) occasion (RO)), and/or monitor random access response (RAR) format responsive to the reliability indication transmission.

Figure 1A:
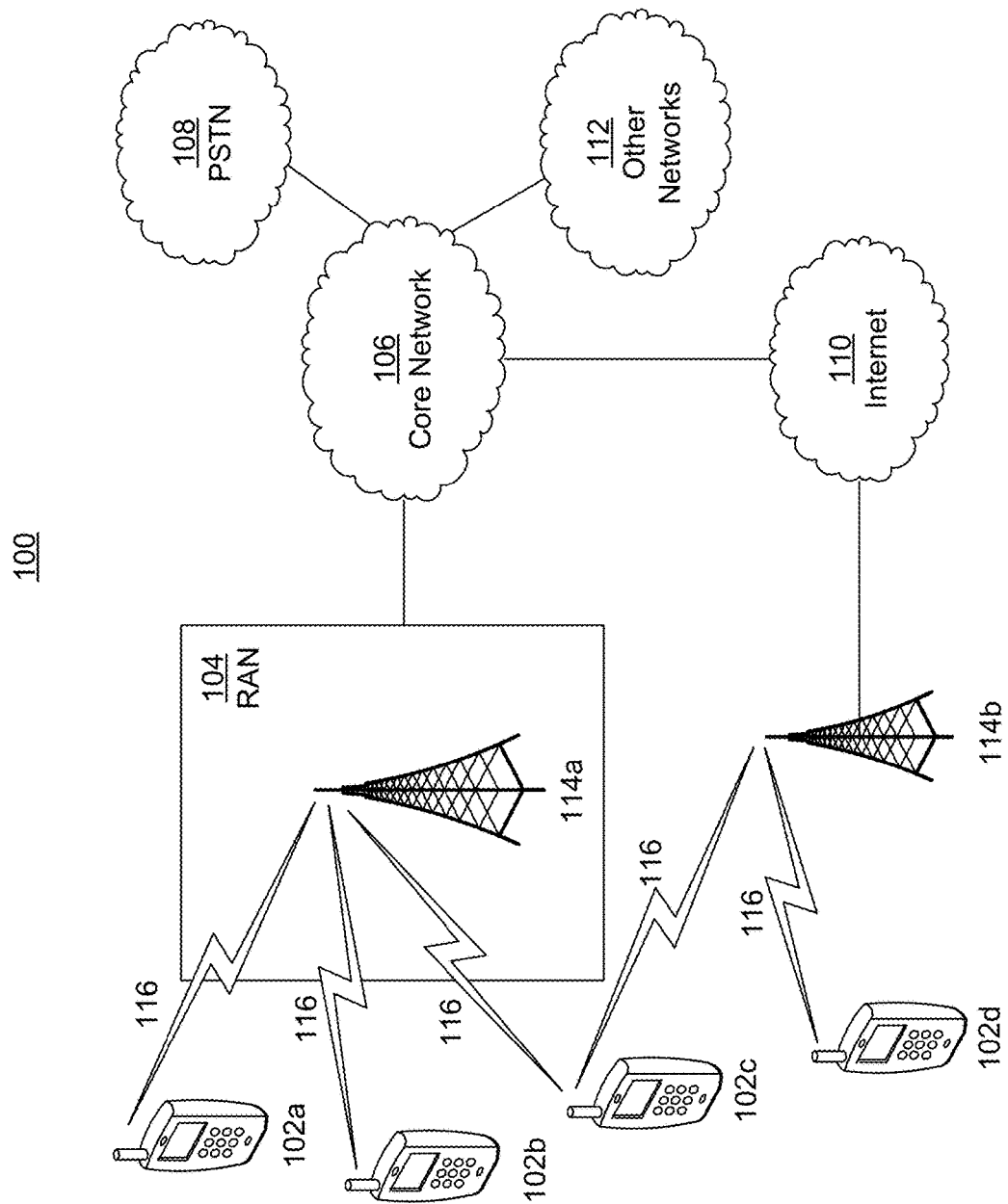
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
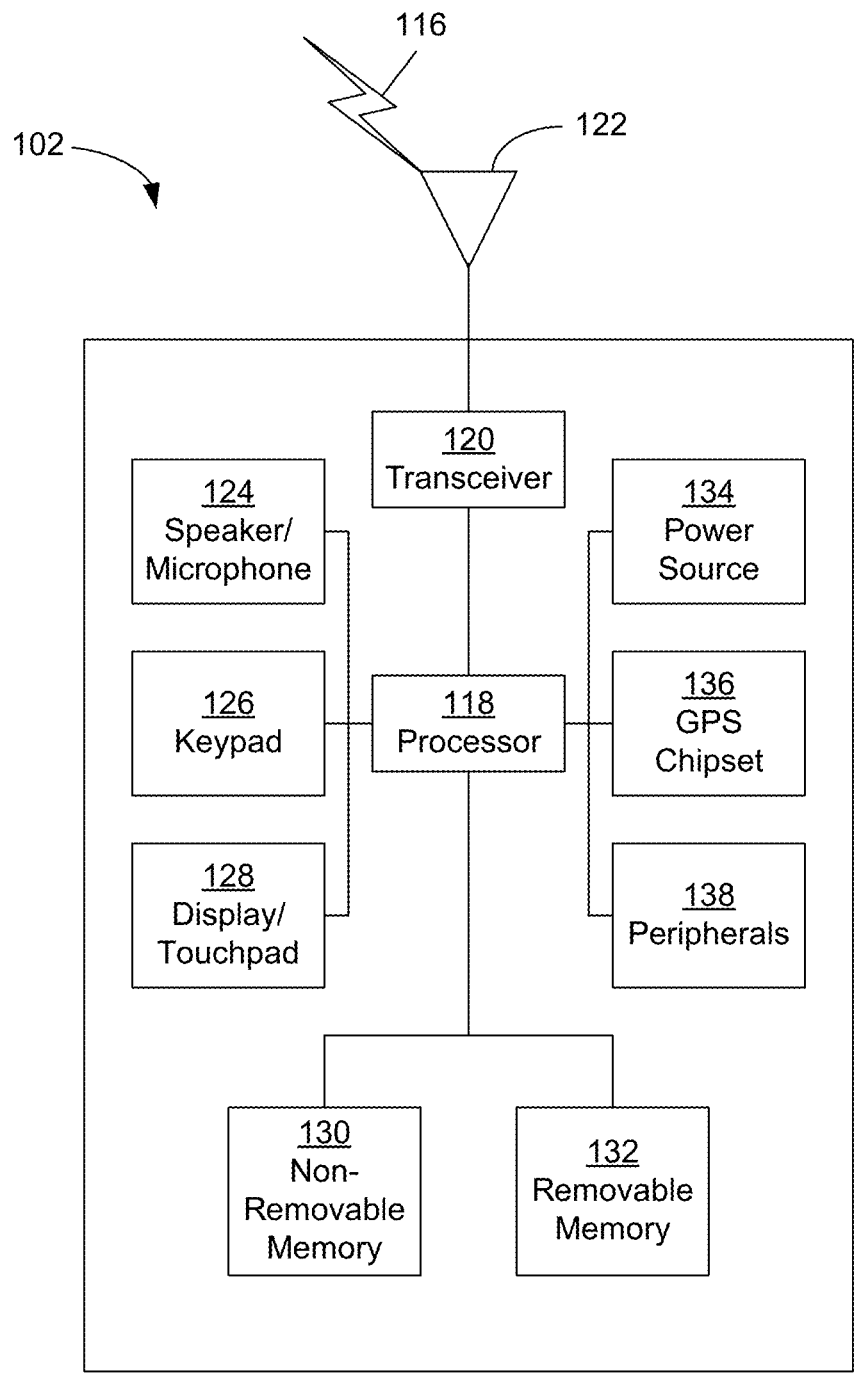
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
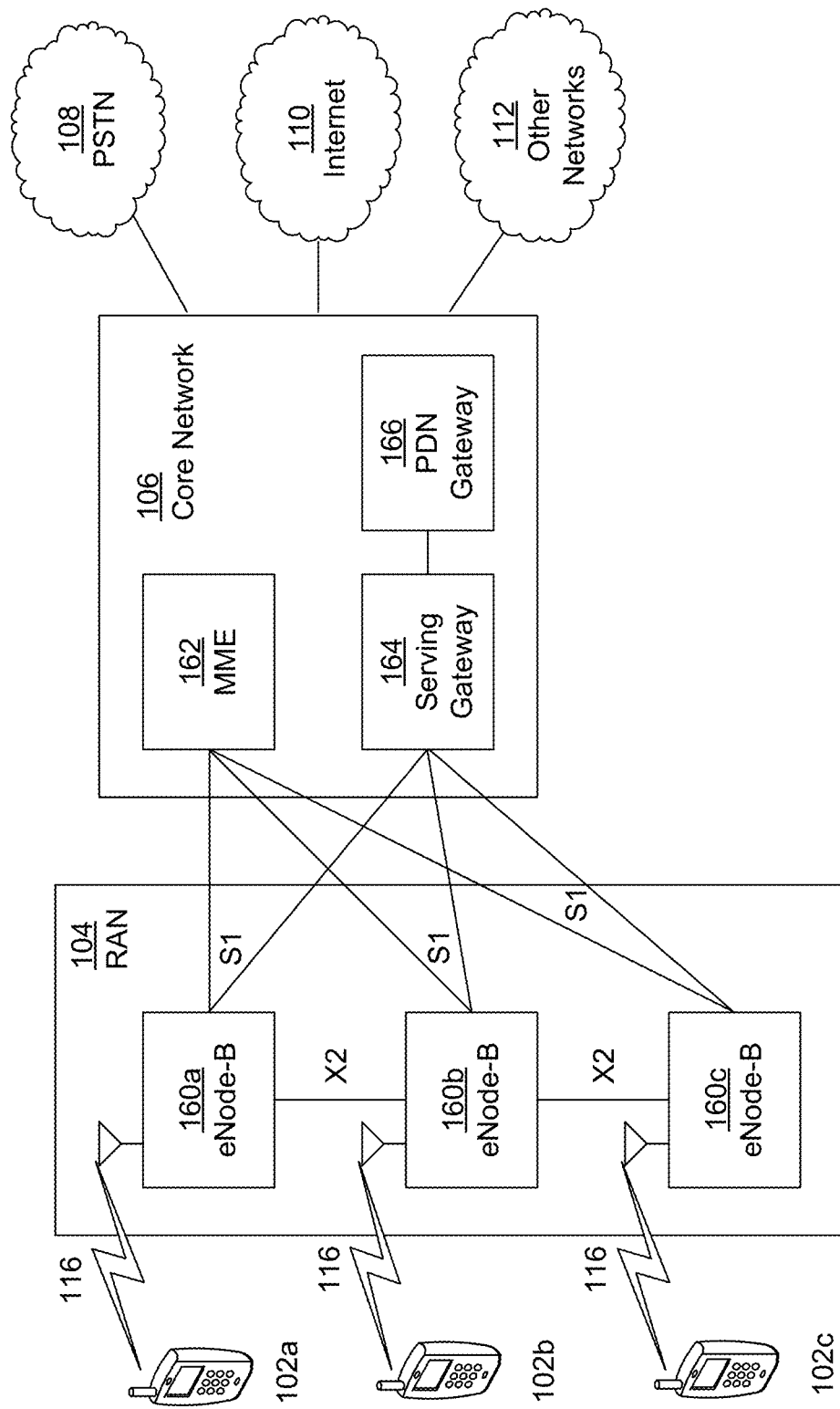
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
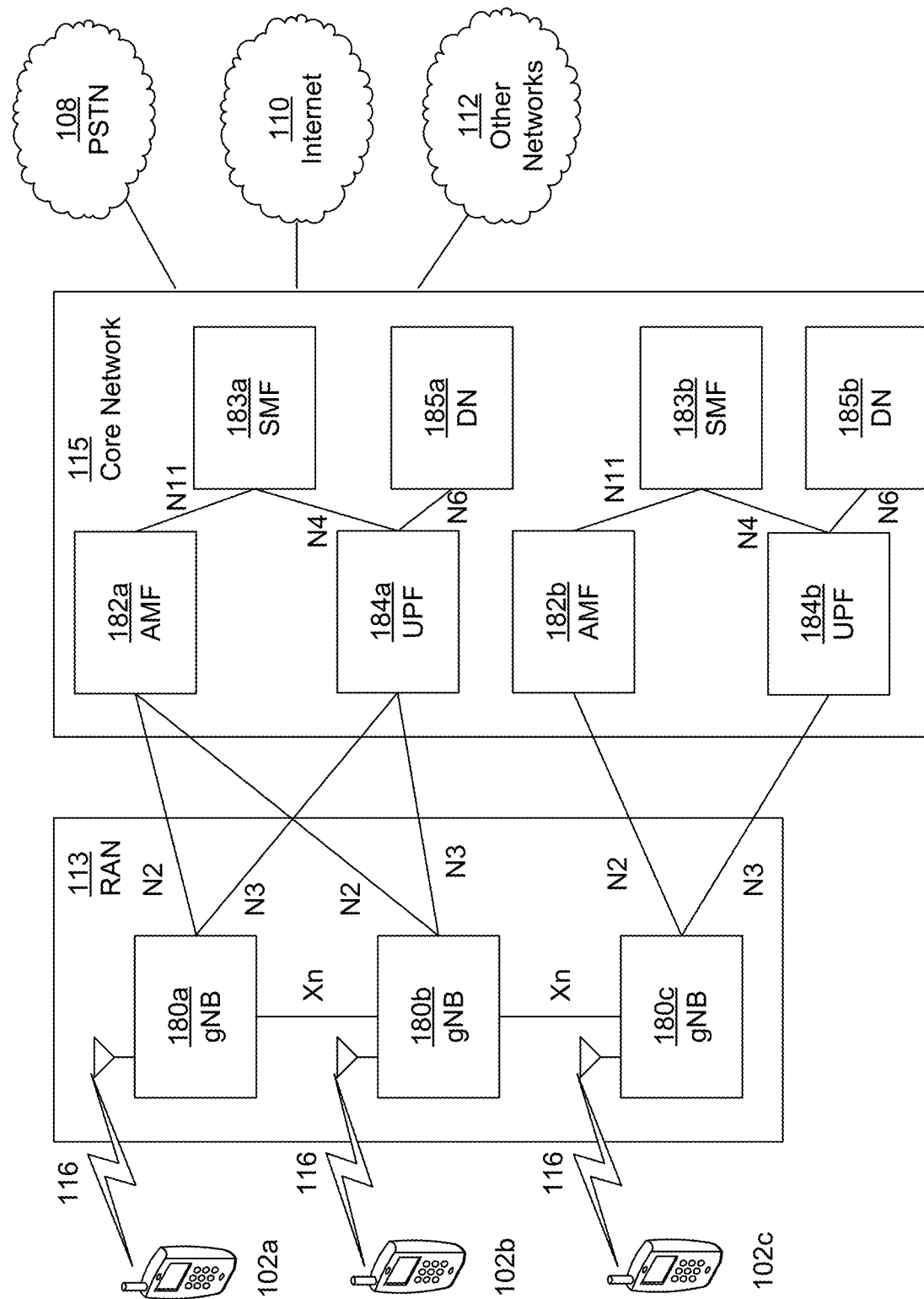
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Configuration(s) referred to herein, such as configurations that are received at a WTRU, may refer to configuration information.

The description is provided for exemplary purposes and does not limit, in any way, the applicability of the methods described herein to other wireless technologies. The term network may refer to one or more base stations (e.g., gNBs), which may be associated with one or more transmission/reception points (TRPs), or to any other node in a radio access network (RAN). A state or states referred to herein (e.g., RRC states) may refer to operating condition(s) of a WTRU.

A WTRU may be configured to operate in a state (e.g., a state of multiple states), which may be illustrated via RRC states herein. Radio resource control (RRC) may have multiple states, which may include an RRC INACTIVE state. A WTRU in an IDLE state may save WTRU battery resources, for example, if the WTRU has not been active (e.g., no data sent or received) for a given time. In IDLE, a WTRU may not continuously monitor a physical downlink control channel (PDCCH). Alternating a WTRU back and forth between CONNECTED and IDLE states may cause control plane signaling in the network, for example, if the WTRU's data is intermittent (e.g., a smart phone sending small amounts of data frequently). Signalling to transition a WTRU from an IDLE state to a CONNECTED state may involve the radio access network (e.g., gNB) and/or the core network (CN), for example, if the network does not have a WTRU context for an IDLE WTRU and/or does not know the (e.g., exact) location of the WTRU. A WTRU may be paged over a geographical area (e.g., an entire geographical area) in which the WTRU is registered (e.g., via the gNBs/ cells in the geographical area), for example, if the transition to CONNECTED state is triggered by downlink (DL) data or an incoming voice call.

Frequent IDLE to CONNECTED transitions may have significant signaling overhead. A WTRU may have bearers that send data infrequently but may be latency sensitive. Transitioning or placing a WTRU in IDLE state may be ineffective, counterproductive, and/or otherwise undesirable in some circumstances if/when the WTRU is not actively (e.g., and frequently) sending or receiving data.

An intermediate state (e.g., in 5G) may be used, e.g., where an example of an intermediate state may be referred to as an INACTIVE state (e.g., and vice versa). A WTRU in an INACTIVE state may have power saving advantages, such as some power saving advantages associated with an IDLE state (e.g., not monitor the PDCCH continuously), and may be returned to the CONNECTED state more quickly than from the IDLE state. An intermediate state (e.g., INACTIVE state) may be implemented, for example, by releasing the WTRU connection while keeping the WTRU's context at the RAN and the WTRU, e.g., without involving the CN (e.g., CN may see the WTRU in INACTIVE state the same as or in a similar way as the CN sees the WTRU in CONNECTED state).

A network may send an indication to a WTRU to transition to the INACTIVE state, for example, by sending the WTRU a message (e.g., an RRCRelease message), which may include a suspension configuration (e.g., which may be referred to as suspendConfig). A suspendConfig may include, for example, one or more of the following: a WTRU identifier (e.g., may be used if/when resuming the connection), a RAN area configuration, security information (e.g., which may be used for securing the resume procedure), or a paging configuration (e.g., for paging from the RAN, which may contrast with paging from the CN for the IDLE state). A RAN area configuration may include, for example, a list of cells (e.g., physical cell IDs (PCIs) or tracking area codes and/or a periodic RAN area update time/timer configuration. A WTRU in INACTIVE may perform cell re-selection (e.g., similar to a WTRU in IDLE state performing reselection). The WTRU may monitor the paging channel, e.g., using the configured RAN paging information.

A WTRU may initiate a resume procedure, for example, by sending an RRCResumeRequest message, which may include the WTRU resume identity and/or the cause for the connection resumption (e.g., mobile originated voice call, mobile originated video call, mobile terminated call as indicated by paging, emergency, RAN area update due to re-selection outside the current RAN area or expiry of duration of time, for example expiry of a timer, etc.).

A network (e.g., in the case of a RAN area update) may send (e.g., immediately send) a WTRU back to an INACTIVE state, for example, by sending an RRCRelease message. An RRCRelease message may include, for example, a WTRU resume identity (e.g., a new WTRU resume identity), a RAN area configuration, security, and/or a paging configuration.

A network may (e.g., alternatively) send (e.g., respond with) an RRCResume message, for example, to indicate to the WTRU to resume the radio connection. Uplink and/or downlink (UL/DL) transmission may proceed (e.g., immediately afterwards), for example, as shown by example in FIG. 3. The signaling shown in FIG. 3 may be compared with the signaling for setting up a connection from the IDLE state (e.g., as previously described). Resumption from an INACTIVE state may save the WTRU and the network signaling. The CN may not be involved in the resumption. Latency may be avoided, e.g., from the WTRU's point of view.

Figure 3:
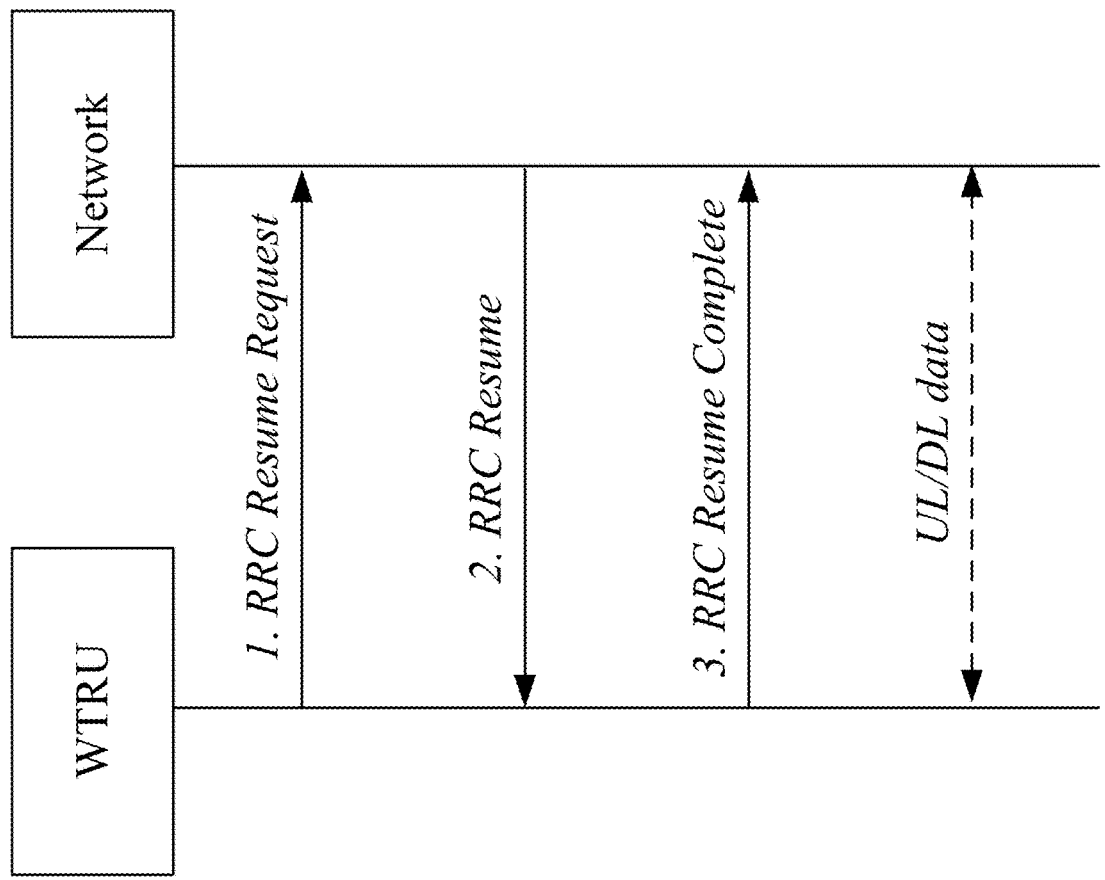
FIG. 3 illustrates an example of an RRC resume request procedure.

FIG. 3 illustrates an example of an RRC resume request procedure.

Multimedia broadcast multicast system (MBMS) services may be delivered over wireless. MBMS services may be provided according to a number of methods, which may include, for example, one or more of unicast cellular transmissions (UC), multicast-broadcast single frequency network (MBSFN), and/or single cell point to multipoint (SC-PTM).

SC-PTM may support broadcast/multicast services over single cell. The broadcast/multicast area may be adjusted (e.g., dynamically adjusted) cell by cell, for example, according to user distribution. SC-PTM may transfer the broadcast/multicast services, for example, using an LTE downlink shared channel (e.g., the physical downlink shared channel (PDSCH)), which may be scheduled using a common RNTI (e.g., a Group-RNTI) for a group of users. SC-PTM scheduling may be agile. Radio resources may be assigned (e.g., dynamically assigned) in the time and frequency domains by PDCCH signaling, for example, based on real time traffic load (e.g., transmission time interval (TTI) by TTI). SC-PTM may be suitable for scenarios where broadcast/multicast service is delivered to (e.g., expected to be delivered to) a limited number of cells, e.g., due to user interests. The concerned cells may change (e.g., dynamically change), for example due to user movement. SC-PTM may support (e.g., allow) efficient radio utilization and/or flexible deployment of applications (e.g., critical communications, traffic information for cars, on-demand TV services, etc.).

MBSFN may provide transmissions from different cells arranged to be identical and/or time aligned, for example, so that transmissions from different cells appear as a single transmission from the WTRU perspective. MBSFN synchronization areas may be defined, for example, to enable time synchronization among eNBs. An MBSFN area may include a group of cells within an MBSFN synchronization area of a network, which may be coordinated to achieve an MBSFN transmission. MBMS architecture may include (e.g., define) various logical entities to perform network functions applicable for MBMS transmission. A multi-cell/multi-cast coordination entity (MCE) may perform admission control, decide whether to use SC-PTM or MBSFN, suspension and resumption for MBMS services, etc. An MBMS gateway (MBMS-GW) may perform session control signaling and/or forward MBMS user data to eNBs (e.g., via IP multicasting).

MBMS may be implemented in wireless systems such as new radio (NR). MBMS may be referred to as multicast and broadcast services (MBS). The terms MBMS and MBS may be used interchangeably herein.

A WTRU may be configured to operate in accordance with a transmission mode (e.g., a WTRU configuration aspect), for example if/when an MBS is configured. Transmission mode and other terms are described without limiting scope or applicability to other (e.g., similar) wireless delivery methods. A transmission mode may include multiple transmission methods, such as unicast, multicast (e.g., SC-PTM), broadcast (e.g., SFN), and/or mixed-mode (e.g., a WTRU may receive unicast and at least one of multicast or broadcast). A receive-only mode (ROM) may be a version (e.g., special case) of non-unicast modes. A sidelink interface e.g., for direct WTRU-to-WTRU communications, may be a version (e.g., special case) of a transmission mode. A transmission mode may be used for delivery of services with different QoS, e.g., eMBB, URLLC, and/or MBS services. A transmission mode may be used for delivery of services to one receiver (e.g., unicast) or multiple receivers (e.g., multicast, groupcast, or broadcast). Services provided to multiple users may include, for example, vehicular communications (e.g., V2x) services (e.g., groupcast) and/or MBS services (e.g., multicast, broadcast). MBS mode or MBS transmission mode may (e.g., be used to) refer to a transmission mode of a WTRU.

A WTRU may be configured for delivery of an MBS service (e.g., a WTRU's configuration aspects may be configured for transmission of MBMS data services). Examples are provided without limiting scope or applicability to similar delivery methods for MBS data and/or control information. A WTRU may be configured to operate with a transmission mode to exchange MBS-related data. A WTRU may have other (e.g., further) configuration aspects for the delivery of MBS services. A configurable aspect may include, for example, the mapping of data (e.g., and/or signaling) bearers for configured transmission method(s) to exchange MBS-related data (e.g., the L2 bearer configuration for MBS). For example, a WTRU may be configured for mixed-mode transmissions (e.g., unicast and multicast) with the delivery of MBS data performed using multicast and/or broadcast transmissions (e.g., only multicast and/or broadcast transmissions), while other services may be transmitted over unicast (e.g., eMBB, URLLC). For example, a WTRU may be configured for mixed-mode transmissions (e.g., unicast and multicast) with the delivery of MBS data performed using unicast (e.g., referred to as point-to-point (PTP)) transmission/mode) and/or multicast transmissions (e.g., referred to as point-to-multipoint (PTM) transmission/mode) irrespective of whether the WTRU is being active with other services (e.g., using unicast transmissions, such as eMBB, URLLC).

MBS (e.g., NR MBS) may support, for example, one or more of the following use cases: V2X, sidelink, and/or public safety (e.g., a 3GPP system may distribute information in a resource efficient way to large numbers of WTRUs supporting V2X application); internet of things (IoT), such as narrowband (NB) IoT and enhanced machine type communication (eMTC) devices (e.g., for software updates), and/or smart grids/utilities; TV video and radio services (e.g., in 5G); push services (e.g., advertisements and/or weather broadcast); Ethernet broadcast/multicast (e.g., for factory automation); and/or extended reality and/or group gaming. TV video and radio services supported by MBS may include, for example, one or more of the following: linear TV, live, smart TV, managed and/or over-the-top (OTT) content distribution, and/or radio services, video distribution (e.g., if/when multiple users concurrently watch the same live streaming); large peaks in concurrent consumption of OTT services (e.g., via unicast media streams); and/or immersive six degrees of freedom (6DoF) volumetric streaming (e.g., much larger than traditional flat, or even 360-degree videos).

MBS service may support application-level retransmissions. A reliability and efficiency tradeoff offered by application-level methods may be costly (e.g., in terms of spectrum efficiency). Application-level methods may not support (e.g., may be insufficient to meet) lower latency requirements. Different MBS services may have different latency, efficiency, and reliability requirements. For example, a power grid distribution may be implemented with a delay of 5 ms and packet error rate of 10-6. V2X may be implemented with a latency of 20 ms for information sharing between WTRUs and road side units (RSUs). Mission critical push-to-talk (MCPTT) may be implemented with key performance indicators (KPIs), such as a mouth-to-ear latency of 300 ms.

A WTRU may be configured to receive MBS transmissions in RRC INACTIVE state, for example, due to reduced power consumption and signaling overhead in INACTIVE state. A network may not monitor and/or improve MBS service delivery for those WTRUs, for example, due to a lack of a tight control/feedback loop in INACTIVE state (e.g., no UL communication while the WTRU is in INACTIVE). A network (e.g., an NR network) may implement various MBS services with increased reliability compared to other (e.g., legacy) services over MBS. MBS performance may be improved. For example, improved reliability may be provided in RRC states (e.g., other than RRC CONNECTED state), such as RRC INACTIVE state.

Wireless technologies/systems (e.g., new radio (NR) may support multiple (e.g., two) delivery modes for MBS. For example, a first delivery mode (e.g., delivery mode 1) may provide a high quality of service (QOS), e.g., in terms of reliability, latency, and/or other criteria. A second delivery mode (e.g., delivery mode 2) may provide a low (e.g., as compared to delivery mode 1) QoS, e.g., in terms of reliability, latency, and/or other criteria. In examples, delivery mode 1 may be supported for multicast services and/or delivery mode 2 may be supported for broadcast services. In examples (e.g., in terms of radio resource control (RRC) states), delivery mode 1 may be supported for a state (e.g., a connected (CONN) state) and/or delivery mode 2 may be supported for multiple (e.g., all) RRC states. WTRUs with multicast may be enabled to enter the INACTIVE state, which may support improved power consumption/overhead and/or may be used as a means to relieve congestion. A WTRU in an INACTIVE state may not (e.g., have means to) provide feedback (e.g., without significant overhead). There may be one or more constraints. A WTRU in INACTIVE may not be uplink (UL) synchronized. The number of WTRUs in INACTIVE receiving MBS services may be substantial. Allocating WTRU-specific resources for feedback may not be feasible or desirable.

Techniques associated with reliability monitoring and/or a reliability indication are disclosed (e.g., may be implemented by or in association with a WTRU), for example, as described herein. The reliability indication may be an indication associated with transmission reliability, for example determined by a WTRU, e.g., based on whether the WTRU receives transmission(s) (e.g., MBS transmission(s), such as MBS transport block(s). A reliability indication may include or indicate a reliability indicator (e.g., reliability metric) and/or a determined value and/or range of the reliability indicator. One or more of the following may apply.

A WTRU may receive MBS configuration information. The MBS configuration information may be associated with an INACTIVE state. For example, MBS configuration information may be received in a message (e.g., an RRC message, such as an RRC release message that includes a suspend configuration (e.g., SuspendConfig) indication, where SuspendConfig may be used as an example). The validity of the MBS configuration information and SuspendConfig indication may be associated with different areas (e.g., logical areas), where for example the logical areas may be an MBS area versus a RAN area. The MBS configuration information may include and/or indicate one or more of the following: multicast radio bearer (MRB) configuration information for an INACTIVE state; one or more triggers for a reliability indication; a reliability metric configuration; or a reliability indication configuration.

MRB configuration information for an INACTIVE state may indicate with one or more of the following. The WTRU may (e.g., in and/or on a condition of entering an INACTIVE state) suspend a point-to-point (PTP) leg and/or maintain a point-to-multipoint (PTM) leg for a split MRB, for example, if MBS reception is allowed in the INACTIVE state. The WTRU may keep one or more MBS bearers active after entering INACTIVE state. The WTRU may suspend other bearers (e.g., non-MBS bearers and/or the MBS bearers different than the one or more MBS bearers configured to be active in INACTIVE).

Triggers for a reliability indication may be associated with one or more of the following. A trigger for a reliability indication may indicate whether reliability monitoring and/or reliability indication is periodic, event triggered, polling based, and/or the like. One or more triggers for a reliability indication may be indicated, for example, in a polling configuration information, an event-based configuration information, and/or a periodic configuration information. Polling configuration information may be associated with a multicast control channel (MCCH). The polling configuration information associated with the MCCH may indicate to the WTRU to perform a reliability indication, for example for a specific MBS service, e.g., by signaling an identity associated with such MBS service. For example, the identity may be indicated by a group radio network identifier (GRNTI) associated with MBS service(s) for which the WTRU is expected to perform reliability monitoring. An event-based configuration information may indicate to perform a reliability indication, for example, if one or more thresholds associated with reliability metrics are satisfied, etc. A trigger to perform a reliability indication may be indicated in a periodic configuration, where for example a periodic configuration information may be received every n modification period, where n may be fractional or greater than or equal to (>=) one (1).

A reliability metric configuration information may be associated with one or more of the following. A reliability metric configuration information may include (e.g., indicate), for example, a type of reliability metric, which may include one or more of a statistic associated with an MBS channel quality indicator (CQI) and/or block error rate (BLER); a number of repetitions versus an expected (e.g., total) number of transmissions within an MCCH modification period; etc.

A reliability indication configuration information may be associated with one or more of the following. A reliability indication configuration information may indicate one or more resources for a reliability indication, which may include, for example, one or more of the following: one or more random access (RA) preambles; a random access channel (or procedure) (RACH) occasion (RO) (e.g., in relation to an MCCH modification boundary); an association between an RA resource and a reliability metric (e.g., or a range thereof); etc.

The WTRU may enter an INACTIVE state, for example, based on a command from a network (e.g., when receiving RRC release with suspendConfig). The WTRU (e.g., in the INACTIVE state) may receive an MBS transmission, e.g., on one or more configured MRBs.

The WTRU may receive an MCCH transmission. The MCCH transmission may include or indicate a polling request for a reliability indication. The MCCH transmission may be received and/or include the polling request in accordance with the GRNTI. The MCCH transmission may be received during a time interval (e.g., MCCH modification period n). Assistance information (e.g., additional assistance information) may be received for reliability monitoring. The assistance information may include, for example, an expected number of MBS transport blocks (TBs) within a modification period. An activation and/or a deactivation of a periodic reliability indication may be received, for example, via a medium access control (MAC) control element (CE).

The WTRU may determine one or more reliability metrics associated with a received MBS transmission (e.g., an MBS TB reception in the INACTIVE state).

The WTRU may monitor one or more reliability metrics, for example during a time interval such as a time interval associated with an MCCH modification period (e.g., MCCH modification period n+1).

The WTRU may determine a reliability indicator (e.g., reliability metric) and/or a value and/or range of the reliability indicator (e.g., reliability metric), for example based on a trigger condition being satisfied, such as a reception of a polling request or other condition described herein. The WTRU may select RA resource(s), for example based on the determined value and/or range of the reliability indicator (e.g., reliability metric), e.g., based on an association and/or mapping between one or more preconfigured resources and the determined value and/or range of the reliability metric.

The WTRU may indicate (e.g., implicitly indicate) the reliability metric and/or the value and/or range of the reliability metric. For example, the WTRU may transmit a reliability indication (e.g., a reliability indication may include or indicate the reliability indicator (e.g., reliability metric) and/or the determined value and/or range of the reliability indicator) via a selected preamble and an RO, where for example the selected preamble and RO may implicitly indicate the reliability metric.

The WTRU may monitor a random access response (RAR) format for a response associated with the reliability indication transmission (e.g., where the RAR format may be specific to the reliability indication transmission). An RAR format (e.g., a response in the RAR format) may include, for example, one or more of the following: an indication of whether the WTRU should perform a subsequent random access and resume procedure; an indication of whether the WTRU should perform a two-step RA (e.g., to provide additional WTRU-specific information, such as an inactive RNTI (I-RNTI) transmission); and/or an indication to go back to and/or stay in INACTIVE state.

Figure 2:
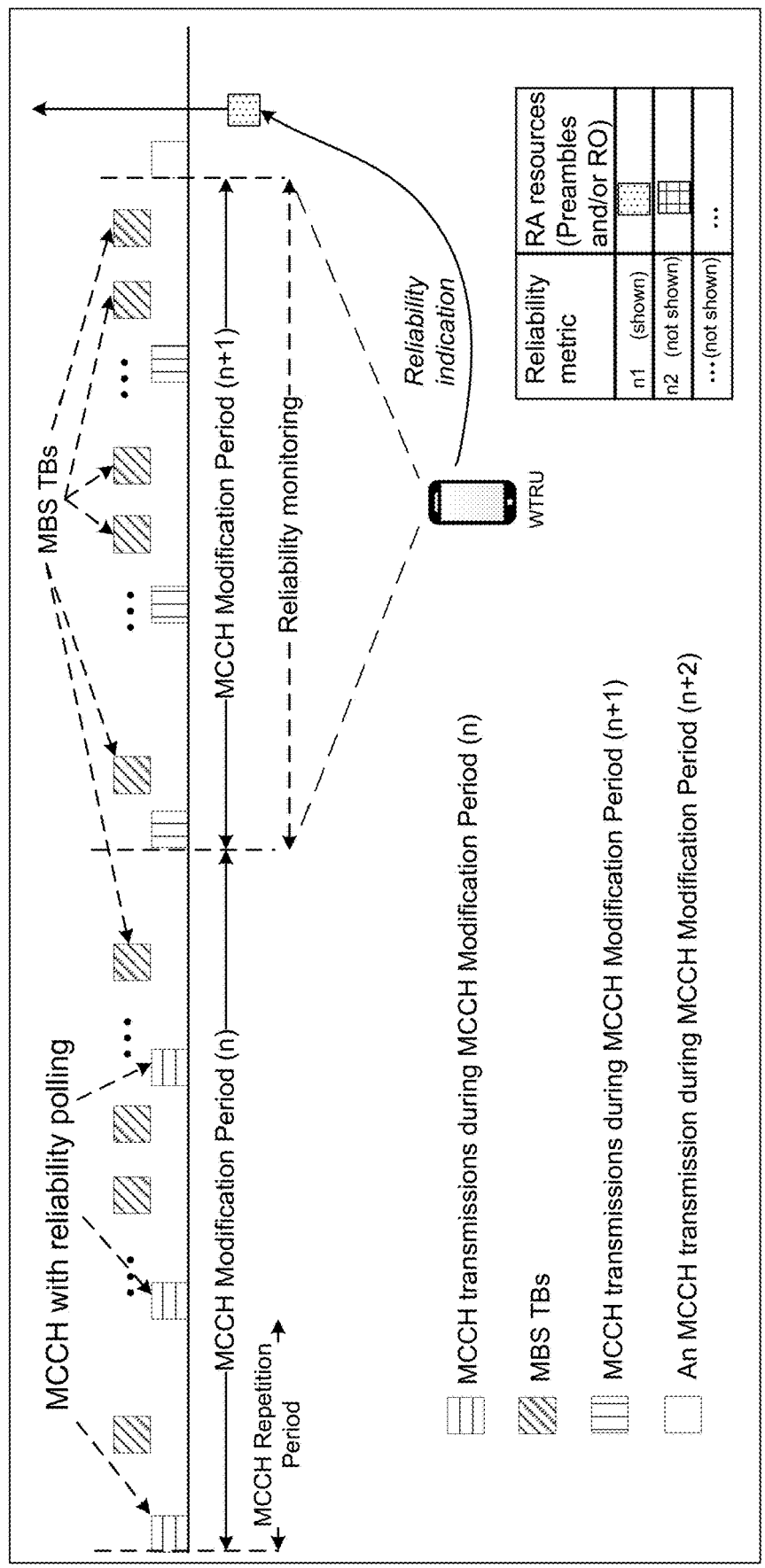
FIG. 2 illustrates an example of reliability monitoring and reliability indication for MBS.

FIG. 2 illustrates an example of reliability monitoring and reliability indication for MBS. A common reference period may be used for reliability indication (e.g., by a network and a WTRU). The common reference period may include a MCCH modification period. A MCCH modification period may include multiple slots. FIG. 2 shows two MCCH modification periods, MCCH modification period n and MCCH modification period n+1. During MCCH modification period n, multiple MCCH transmissions may be sent (e.g., by the network). Some or all of the MCCH transmissions may include the same information (e.g., same polling request). For example, the MCCH transmission may indicate the expected number of TBs to be sent (e.g., by the network) during the next MCCH modification period (e.g., MCCH modification period n+1). A WTRU may determine the number of TBs that are actually received and/or successfully decode, and determine a ratio of received TBs versus sent TBs using the expected number of TBs to be sent during the next MCCH modification period and using the number of TBs that are actually received. A value of the reliability indicator may include the ratio. A MCCH transmission may be sent for an (e.g., each) MCCH repetition period.

The MCCH transmission may indicate a polling request. For example, an (e.g., each) MCCH transmission may include a polling request (e.g., each MCCH transmission may include the same polling request). A WTRU may or may not successfully decode a MCCH transmission that indicates the polling request. If the WTRU successfully decodes the MCCH transmission, the WTRU, based on the reception of the polling request, may be triggered to measure one or more values of a reliability indicator. For example, the measurements of the one or more values of a reliability indicator may be based on information included in the MCCH transmission. During MCCH modification period n+1, multiple MCCH transmissions may be sent (e.g., by the network), for example, per repetition period. A MCCH transmission sent during MCCH modification period n+1 may include a polling request that, if successfully decoded, triggers measurements of one or more values of a reliability indicator during next MCCH modification period (e.g., MCCH modification period n+2). The WTRU may determine PRACH resources to send a preamble based on a determined value of the reliability indicator. As shown in FIG. 2, after the MCCH modification period n+1, the value of the reliability indicator may be indicated by sending the preamble using determined PRACH resources.

As an example, a WTRU may be configured to receive in an RRC CONNECTED state an MBS configuration associated with an RRC INACTIVE state. The MBS configuration may include one or more triggers for reliability indication, mapping between a range of reliability metric and UL resources for reliability metric indication. Upon entering RRC INACTIVE state, the WTRU may suspend the PTP leg (if any) and start or continue PTM leg for MBS services. The WTRU may monitor for one or more triggers for a MCCH transmission with a polling request for reliability indication. The polling request may be associated with a specific MBS bearer, provide assistance information e.g., the number of MBS transport blocks within the modification period n+1. The WTRU may determine a reliability metric during the time interval associated with MCCH modification period n+1, for example, the reliability metric may be ratio of number of successful MBS transport blocks received to total number of MBS transport blocks transmitted within a modification period. The WTRU may determine RA resource applicable for reliability indication as a function of reliability metric value. The WTRU may transmit RA preamble on the determined RA resource The WTRU may monitor for an RAR format associated with the reliability indication. Upon receiving an RAR matching the reliability indication, the WTRU may perform one or more following actions based on received RAR: performing another RA procedure to initiate a resume procedure or staying in RRC INACTIVE to receive MBS services.

A WTRU may be configured to receive RAN paging with reliability polling (e.g., instead of MCCH polling).

A WTRU may be configured to initiate a transition from INACTIVE to CONNECTED, for example, based on the value and/or range of the reliability metric being below a threshold.

Reliability monitoring may be performed over a shorter time scale, for example, based on a duration of time that may be tracked (e.g., via a timer). In examples, the shorter time scale may be a time period that is shorter than the length of a modification period (e.g., MCCH modification period). A duration of time may be tracked (e.g., timer may be started), for example, if/when a WTRU receives polling. The WTRU may transmit the reliability indication on the earliest RO, for example, based on expiration of the duration of time (e.g., expiration of the timer).

Features are described herein that are associated with an MBS reliability indication. Example features described herein may be based on transmissions and delivery of MBS services. Features described are not limited to example scenarios, systems, and services. Features described herein may be applicable to other types (e.g., any type) of transmissions and/or services, e.g., including but not limited to V2X, extended reality, gaming, IoT/MTC, industrial use cases, etc.

A WTRU configured for reception of data for MBS may be configured with a data radio bearer (DRB), such as an MRB (Multicast Radio Bearer). A DRB may be dedicated to MBS reception. An MBS service and MRB may be used interchangeably (e.g., considered equivalent), for example, from an L2 and L3 perspective. An MBS service may be configured with zero, one, or more than one MRBs.

The term "INACTIVE" or "INACTIVE state" may refer to a WTRU performing or being configured to perform one or more (e.g., or the set) of the following: monitor short messages transmitted with paging RNTI (P-RNTI) over downlink control information (DCI); monitor a paging channel for CN paging (e.g., using a 5G S temporary mobile subscriber identity (5G-S-TMSI)) and/or RAN paging (e.g., using a full I-RNTI); perform neighbor cell measurements and WTRU controlled mobility based on network (NW) configuration (e.g., cell (re-)selection); perform RAN-based notification area updates periodically and/or if/when moving outside a configured RAN-based notification area; or acquire system information and/or send an SI request (e.g., if configured).

Example features may be described herein without limitation in terms of an INACTIVE state. Techniques described herein may be applicable to other RRC states (e.g., IDLE state, CONNECTED state, and so on).

One or more information elements and/or configuration parameters may be described without limitation in various examples in terms of an RRC configuration. Techniques described herein may be applicable to other configurations (e.g., any configuration), a default configuration, a specified configuration, a broadcast configuration (e.g., signaled via system information), a group-specific configuration (e.g., specific to a multicast group), an area-specific configuration (e.g., MBS area, RAN area, or the like), and/or a WTRU-specific configuration (e.g., signaled via RRC, MAC, DCI or layer 1 signals).

A bearer configuration and/or architecture may be provided for MBS in INACTIVE. A WTRU (e.g., configured for reception of data for an MBS) may be configured with a data radio bearer (DRB), which may be dedicated to MBS reception (e.g., via a multicast radio bearer (MRB). MBS service and MRB may be used interchangeably (e.g., considered equivalent), for example, from the L2 and L3 perspective. An MBS service may be configured with zero, one or more MRBs.

An MRB (e.g., similar to a DRB) with several QoS flows may be multiplexed within an MRB (e.g., a given MRB). An MRB may employ a split bearer protocol architecture, for example, with one packet data convergence protocol (PDCP) entity and two radio link control (RLC) entities. A first RLC entity may be for PTM and a second RLC entity may be for PTP operation, for example, as shown by example in FIG. 4.

Figure 4:
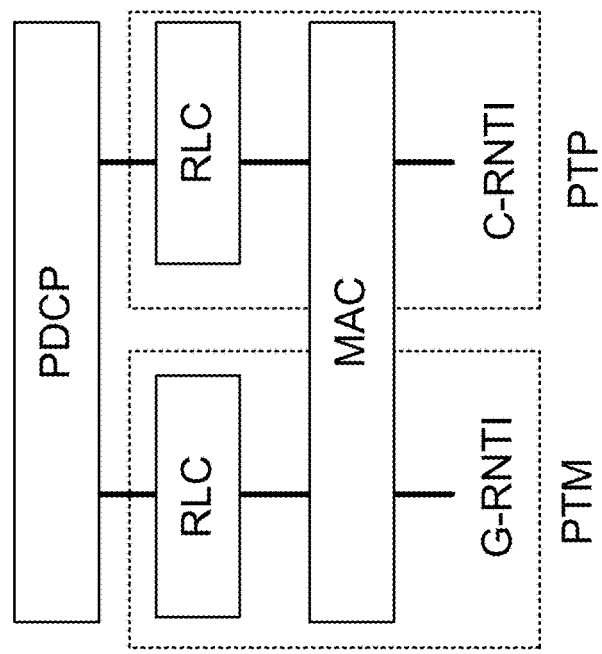
FIG. 4 illustrates an example of an MRB with a split bearer protocol architecture.

FIG. 4 illustrates an example of an MRB with a split bearer protocol architecture.

As shown in FIG. 4, the cell radio network identifier (C-RNTI) may identify (e.g., uniquely identify) a WTRU's RRC connection within a cell while the group RNTI (G-RNTI) may identify the group of WTRUs participating in a multicast. A WTRU configured with an MRB (e.g., according to the example architecture shown in FIG. 4) may monitor DL scheduling for the MRB on the C-RNTI and/or G-RNTI. In examples, the RLC entity associated with PTM may operate in unacknowledged mode (UM) while the RLC entity associated with PTP may operate in acknowledged mode (AM). Techniques (e.g., methods) disclosed herein may be applied to other operation modes (e.g., PTM operating in transparent mode (TM) or AM, or PTP operating in TM or UM). In examples, a WTRU may be configured to suspend PTP operation while transitioning to INACTIVE state while maintaining PTM operation. For example, a WTRU may (e.g., on a condition of moving to INACTIVE state) reconfigure the MRB bearer, e.g., from split bearer MBS operation to PTM bearer operation. The WTRU may release the RLC entities associated with the PTP RLC entity of an MRB. The WTRU may reconfigure (e.g., implicitly reconfigure) the MRB to PTM, for example, if (e.g., only if) the NW indicates that the MBS reception is allowed in INACTIVE state.

An INACTIVE WTRU (e.g., which may refer to a WTRU in INACTIVE herein) may initiate a resume procedure, for example to indicate a request to the network from the WTRU for an MBS service (e.g., a reliable MBS service). A resume procedure may be performed, for example, by sending an RRCResumeRequest, which may include a resume cause (e.g., mbs-call-interest) and/or information about the MBS session identification (e.g., in case there are several MBS sessions active at the same time). In examples, an INACTIVE WTRU may include a preference indication, which may indicate whether the WTRU wants to remain in INACTIVE state or wants to transition to CONNECTED state for the MBS service delivery. In examples, an INACTIVE WTRU (e.g., that has sent a request to be resumed) may receive a response message from the network to resume the connection (e.g., RRCResume). The WTRU may (e.g., thereafter) receive an RRC Reconfiguration message to configure MRB(s) (e.g., required MRB(s)).

An INACTIVE WTRU (e.g., that has sent a resume request, for example a request to be resumed) may receive a response message from the network to resume the connection (e.g., RRCResume). A response message may include the configuration of the MRB(s) (e.g., required MRB(s)). The WTRU may apply the MRB configuration (e.g., required MRB configuration). The WTRU may stay in the INACTIVE state. The WTRU may receive MBS data, e.g., according to the MRB configuration.

A WTRU in a CONNECTED state that has an MRB configuration (e.g., where the MRB may or may not be active at the time) may be transitioned (e.g., sent) to an INACTIVE state (e.g., via a network message, for example an RRC release message). An indication (e.g., in an RRC release message) may be provided/received indicating that the WTRU continue receiving MBS data while in the INACTIVE state. In examples, an RRC release message may include a new or an updated MRB configuration, for example, if/when a WTRU in CONNECTED state is sent to an INACTIVE state.

A WTRU may indicate that it is interested to receive or join an MBS session while in a CONNECTED state and may be released to INACTIVE state. In examples, the MBS session has not started, and the network and/or the WTRU may indicate (to the network) if and/or when the MBS session becomes active. For example, the WTRU may send a request for an MBS session in a CONNECTED state. The WTRU (e.g., in the INACTIVE state) may receive an indication (e.g., indicating the MBS session), for example, if/when the MBS session becomes active. The indication may be or may be included in one or more of the following: RAN paging; an MBS session start indication in a multicast control channel (MCCH); an MBS session start indication in the SIB; etc. The WTRU may initiate the MBS service (e.g., reception of the MBS service), for example, based on receiving an indication (e.g., that the MBS session is active).

An INACTIVE WTRU (e.g., configured with an MRB with a split bearer configuration, such as one RLC AM entity associated with the C-RNTI and another RLC UM entity associated with the G-RNTI) may suspend an RLC leg associated with the C-RNTI for PTP transmission, stop monitoring the C-RNTI on the PDCCH, and monitor the G-RNTI (e.g., only the G-RNTI on the PDCCH for MBS data reception.

A WTRU may be configured with configured grants that may be used for reception of MBS data while in an INACTIVE state. For example, a periodic grant configuration may indicate which radio resources (e.g., time and/or frequency) include data for the MBS session(s). In examples, a configured grant for MBS reception may be provided while a WTRU is in a CONNECTED state. A configured grant may be provided based on (e.g., as part of) a transition to INACTIVE state (e.g., in an RRC release message).

Features associated with reliability monitoring and/or a reliability indication are described herein and may be associated with the INACTIVE state. A reliability indicator (e.g., reliability metric) may be associated with a reliability indication (e.g., the reliability indicator may be provided in or indicated in the reliability indication). The term "configure to" herein may indicate (e.g., include) the associated device (e.g., WTRU) performing the configured action.

A reliability metric may be based on a channel quality indicator (CQI). A WTRU may be configured to monitor a CQI associated with MBS reception. A WTRU may be configured to derive an MBS CQI index. For example, a (e.g., each) MBS CQI index may be associated with a combination of one or more of modulation scheme(s), target code rate(s) and transport block size(s). In examples, the WTRU may be configured to derive a reliability metric that corresponds to the highest MBS CQI index such that a transport block associated with MBS transmission may be received with a transport block error probability not exceeding a preconfigured value, where the received transport block may have a combination of modulation scheme, target code rate, and transport block size associated with that MBS CQI index. And the transport block being received with the transport block error probability not exceeding the preconfigured value may be determined by the WTRU to correspond to a CQI index occupying a group of downlink physical resource blocks (e.g., an MBS reference resource). The MBS reference resource may be preconfigured within an MBS bandwidth part (e.g., with a specific numerology). For example, the WTRU may be preconfigured with a transport block error probability (e.g., specifically for calculation of MBS CQI). The configuration may be specific to an MBS service. The WTRU may be configured with a CQI table (e.g., specific to reliability indication). For example, a CQI index (e.g., each CQI index) may be four (4) bits and/or may map to a (e.g., specific) modulation and coding rate (e.g., for a given MBS block error rate (BLER) configuration). In examples, a WTRU may be configured to use a subset of a CQI table (e.g., a legacy CQI table). For example, a WTRU may be configured with CQI indices from 0 to 7, e.g., where the CQI indices from 0 to 6 may correspond to a (e.g., legacy) CQI table and the CQI index of 7 may indicate a CQI value above 6 (e.g., any CQI value above 6).

A WTRU may be configured to measure MBS CQI within a preconfigured range of CQI values. For example, a first CQI range may be configured as CQI indices 1 to 6, a second CQI range may be configured as CQI indices 7 to 9, a third CQI range may be configured as CQI indices 10 to 15, etc.

In examples, a WTRU may be configured to measure (e.g., and/or determine) whether an MBS CQI is less than or equal to a CQI index. For example, a WTRU may be configured to determine whether a measured CQI value is less than CQI index 7.

A reliability metric may be based on HARQ status. A WTRU may be configured with (e.g., receive an indication of) a number of repetitions for MBS transport blocks. A WTRU may be configured to perform incremental redundancy combining across the repetition of an MBS transport block. A WTRU may be configured to disable HARQ feedback, for example, while in (e.g., on a condition of being in) an INACTIVE state. A WTRU may be configured (e.g., for the purpose of calculating a reliability metric) to maintain a statistic related to the number of NACKs generated, for example, until the transport block is successfully decoded. A WTRU may be configured to measure a statistic related to number of NACKs within a preconfigured time interval.

A WTRU may be configured to monitor a statistic associated with the number of repetitions associated with successful decoding of an MBS transport block.

A WTRU may be configured to monitor the average number of repetitions for successful decoding of an MBS transport block. A WTRU (e.g., alternatively and/or additionally) may (e.g., be configured to) determine the ratio of repetitions (e.g., total repetitions) to the number of transport blocks (e.g., required) for successful decoding of an MBS transport block (e.g., within a time interval). A WTRU may receive an indication of a total number of MBS transport blocks scheduled or expected to be scheduled (e.g., within a time interval), for example, to enable determination of the total number of transport blocks. The indication may be transmitted in an MCCH. The indication may be in configuration information (e.g., configuration information received via RRC) associated with an MBS service.

A WTRU may be configured to monitor a maximum number of repetitions (e.g., used, required, etc.) for successful decoding of an MBS transport block. A WTRU (e.g., alternatively and/or additionally) may be configured to calculate a reliability metric based on the maximum number, for example, if the number of transport blocks (e.g., requiring the maximum number of repetitions) is above a threshold. For example, a ratio of the number of transport blocks (e.g., requiring the max number of repetitions) to the actual number of transport blocks (e.g., within the time interval) may be above a threshold.

A WTRU may be configured to monitor a median and/or a mode of the number of repetitions for successful decoding of MBS transport block.

A reliability metric may be based on multicast channel block error rate (MCH BLER). A WTRU may be configured to monitor the result of PDSCH decoding associated with MBS reception. For example, a WTRU may be configured to count the number of cyclic redundancy check (CRC) errors associated with MBS reception (e.g., in a time interval). A reliability metric may be defined, for example, as a function of the number of CRC errors (e.g., within a time interval).

A WTRU may be configured to determine MCH BLER estimation, for example, based on an evaluation of the status of a CRC check result associated with MBS transport blocks. In examples, the BLER may be computed (e.g., over a measurement period) as a ratio between the number of received MBS transport blocks resulting in a CRC error and a total number of MBS transport blocks (e.g., expected to be) received (e.g., within the same measurement period). A measurement period may correspond to a time interval. In examples, a time interval may be defined (e.g., configured or set) in relation to an MCCH modification period. In examples, a time interval may be tracked, e.g., based on a preconfigured timer.

In examples, a WTRU may determine a reliability metric as a ratio between the number of successful MBS PDSCH received to the number of successful MBS PDCCH received within a time interval.

A reliability metric may be based on one or more reference signal (RS) measurements. A WTRU may (e.g., be configured to) determine a reliability metric based on one or more reference signal measurements. For example, a WTRU may (e.g., be configured to) measure an MBSFN reference signal received power (MBSFN RSRP). An MBS RSRP may be defined (e.g., and/or determined), for example, as an (e.g., a linear) average over the power contributions (e.g., in units of Watts (W) of the resource elements that carry MBS reference signals within the considered measurement frequency bandwidth. For example, an MBS RSRP measurement may assume an RS transmission with an antenna port configured for MBS transmissions.

For example, a WTRU may be configured to measure MBS reference signal received quality (RSRQ). An MBS RSRQ may be defined (e.g., and/or determined), for example, as a ratio Nx MBS RSRP/(MBS carrier reference signal strength indicator (RSSI)), where, for example, N may be the number of RBs of the MBS carrier RSSI measurement bandwidth. Measurements in the numerator and denominator may be made over the same set of resource blocks. An MBS carrier RSSI may comprise (e.g., be defined and/or calculated as), for example, a linear average of the total received power (e.g., in units of W) observed in the orthogonal frequency-division multiplexing (OFDM) symbols that include reference symbols for an antenna port configured for MBS transmissions (e.g., within a preconfigured MBS measurement bandwidth), over N number of resource blocks. The power may include power from one or more (e.g., all) sources, such as co-channel serving and non-serving cells, adjacent channel interference, thermal noise, etc.

Reliability monitoring may be associated with a reliability indication. A WTRU may be configured to perform a reliability monitoring procedure, which may include one or more of the following: measuring one or more reliability metrics; maintaining a counter associated with a reliability metric; determining a statistic associated with a reliability metric; monitoring value(s) of the one or more reliability metrics, comparing the metric(s) or value(s) with one or more thresholds (e.g., preconfigured thresholds); or triggering transmission of a reliability indication to a network (e.g., based on the metric(s) or value(s) meeting a threshold condition (e.g., trigger condition). A WTRU may be configured to perform a monitoring procedure over a preconfigured time interval. A time interval may be configured (e.g., explicitly configured). A time interval may be specific to an MBS service. A time interval may be (e.g., defined/tracked) based on a time (e.g., timer). For example, a duration of time (e.g., the value of a timer) may be part of an MBS configuration. In examples, a time interval may be implicit. In examples, a time interval may correspond to an MCCH repetition period. In examples, a time interval may correspond to an MCCH modification period. In examples, a time interval may be defined in relation to an MCCH modification period. In examples, the relationship may be expressed in terms of offsets. In examples, a time interval may be defined in relation to a RAN paging interval. A WTRU may be configured to transmit a reliability indication, which may implicitly or explicitly indicate a reliability metric. Different time intervals may be specified for different trigger conditions.

In examples, the evaluation of a condition may continue for an evaluation period. For example, a WTRU may be configured to evaluate the average CQI (e.g., for an evaluation duration). A WTRU may continue measuring the CQI for a duration, average the measured CQIs, and compare the average with the provided threshold. In examples, a WTRU may be provided with scaling factors that may be used to calculate and/or aggregate the conditions. For example, values measured at the start of an evaluation period may be assigned higher weights than values measured near the end of the evaluation period.

The evaluation of a condition may stop before an evaluation duration is finished, for example, if a criterion is already met. For example, a WTRU may be configured to detect whether more than a certain (e.g., configured, determined, set, or selected) number of failures are detected. The WTRU may stop monitoring the number of failures, for example, if the WTRU detects the configured number of failures before the evaluation duration ends.

A WTRU may be configured to perform reliability monitoring, for example, if/when at least one MRB is (e.g., configured to be) active during an INACTIVE state. In examples, a WTRU may receive a configuration associated with reliability monitoring as a part of MRB configuration or as a part of INACTIVE configuration (e.g., suspendConfig). A WTRU may be configured to apply a reliability configuration, for example, based on (e.g., upon) entering INACTIVE state and/or based on (e.g., upon) applying suspend configuration, e.g., if/when at least one MRB is (e.g., configured to be) active.

In examples, a WTRU may be configured to perform reliability monitoring in an INACTIVE state, e.g., if/when the WTRU receives a reliability polling (e.g., polling request) from the network. Reliability polling may be received in an MCCH transmission. Reliability polling may be received in an MCCH change notification. Reliability polling may be received in a RAN paging message. Reliability polling may indicate whether reliability monitoring is requested for one (e.g., a specific) multicast group or more (e.g., all) multicast groups. A WTRU may be configured to activate or deactivate reliability monitoring, e.g., via a MAC CE.

A WTRU may start reliability monitoring during a time window, for example corresponding to modification period n+1, based on receiving reliability polling during MCCH modification period n. In examples, a WTRU may be configured to start/track a duration of time (e.g., via a timer) based on receiving the polling and/or perform reliability monitoring (e.g., as long as the tracked duration of time has not expired, e.g., the timer is running).

In examples, a WTRU may be configured to perform reliability monitoring for an MBS service (e.g., a specific MBS service) and/or an MBS radio bearer (e.g., a specific MBS radio bearer). Reliability monitoring may be configured, for example, via an RRC configuration, a MAC CE, etc. An MBS radio bearer and/or MBS service may be identified, for example, by a group identity, an RNTI, and/or the like. A WTRU may measure a reliability metric, for example, for the MBS transport blocks associated with the MBS service (e.g., only for the MBS transport blocks associated with the MBS service). Transport blocks may be scheduled, for example, via a configured group RNTI.

In examples, a WTRU may be configured to release and/or stop reliability monitoring and/or a reliability indication procedure based on (e.g., on a condition of) leaving INACTIVE state (e.g., entering CONNECTED state or IDLE state).

In examples, a WTRU may be configured to release and/or stop reliability monitoring and/or a reliability indication procedure based on (e.g., on a condition of) one or more of the following: reselecting to a cell outside of the MBS area configured for the WTRU; reselecting to a cell outside of a current RAN area applicable to an INACTIVE state; reselecting to a cell not supporting an MBS service; reselecting to a cell not supporting the MBS service the WTRU may be currently configured with; or reselecting to a cell not supporting the reliability monitoring and/or indication procedure.

One or more triggers may be provided for transmission of a reliability indication (e.g., on a condition of the trigger occurring, the WTRU is triggered to send a reliability indication). A WTRU may initiate transmission of a reliability indication (e.g., transmit a reliability indication), for example, based on one or more of the trigger conditions that may be configured as WTRU-specific or may be configured specific to an MBS service (e.g., as disclosed herein). Triggers for a reliability indication may be one or more (e.g., a combination) of the following: polling based, event triggered, and/or periodic. A WTRU may (e.g., if/when more than one trigger type is configured) prioritize a polling-based indication followed by an event triggered indication followed by a periodic indication.

A reliability indication trigger may be based on polling, e.g., in an MCCH transmission. A WTRU may trigger a reliability indication transmission based on polling information in the MCCH transmission. For example, a WTRU may (e.g., be configured to) monitor an MCCH, e.g., at each MCCH repetition period within an MCCH modification period. For example, an MCCH transmission received during modification period n may notify a WTRU about an action to perform in a subsequent MCCH modification period (e.g., greater than period n (>n). A WTRU may be configured to perform reliability monitoring in modification period n+k. A WTRU may be configured to perform a reliability indication transmission in modification period n+1, wherein l>k (e.g., k=1 and l=2).

A WTRU may receive reliability indication polling in a transmission (e.g., in an MCCH transmission which may be used as an example). The MCCH transmission (e.g., reliability indication polling in the MCCH transmission) may indicate that the WTRU transmit a reliability indication in an upcoming modification period (e.g., next modification period, identified subsequent modification period, etc.). An MCCH transmission may indicate (e.g., configure) filtering criteria for a reliability indication. For example, filtering criteria may specify a highest reliability metric applicable to a reliability indication. For example, a WTRU may transmit a reliability indication if/when (e.g., only if) the measured reliability metric is lower than or equal to the configured filtering criteria. A WTRU may skip a reliability indication transmission, for example, if the reliability metric is above a configured filtering criteria.

A WTRU may receive reliability indication polling specific to an MBS radio bearer and/or an MBS service. A WTRU may trigger a reliability indication (e.g., determine to send a reliability indication), for example, if (e.g., only if) the WTRU is configured for an MBS radio bearer and/or an MBS service (e.g., a specific MBS radio bearer and/or MBS service). For example, polling information received via an MCCH that is scheduled based on a group RNTI may activate the reliability indication from the WTRUs configured for an MBS radio bearer (e.g., and/or an MBS service) associated with the group RNTI. In examples, a WTRU may perform a reliability indication for one or more MBS bearers for which reliability monitoring is configured.

A WTRU may receive an MCCH transmission with a polling request associated with a GRNTI (e.g., a preconfigured GRNTI). A WTRU may receive information that indicates a number of MBS transport blocks within a modification period n (e.g., an expected number of MBS transport blocks within a modification period n. A WTRU may use the information to determine a reliability metric (e.g., a ratio of the number of successfully received transport blocks to the total number of MBS transport blocks within the modification period, a number of successfully received transport blocks within the modification period, etc.). A WTRU may determine the average number of retransmissions and/or repetitions (e.g., required) for successful MBS transport block reception.

Polling via MCCH may be realized, for example, using polling indication in RAN paging.

A reliability indication may be periodic, e.g., relative to an MCCH modification period. A WTRU may be configured to periodically transmit a reliability indication. Periodicity may be configured, for example, as a function of a modification period (e.g., at every modification period boundary and/or at a RACH occasion at an offset from the modification period boundary). For example, a periodicity of a reliability indication may be configured to be a multiple of a modification period (e.g., every n modification periods, where n may be greater than or equal to one (>=1). In examples, n may be fractional, which may mean there could be multiple reliability indications within a modification period.

A WTRU may receive a message (e.g., an RRC configuration) that indicates the periodicity of a modification period. Different periodicities may be configured for reliability indications associated with different MBS radio bearers. A WTRU may be configured to activate and/or deactivate a periodic reliability indication via a MAC CE. Periodic reporting may be selectively activated or deactivated, for example, on a per MBS radio bearer basis.

A WTRU may (e.g., be configured to) transmit a reliability indication based on one or more (pre) configured events. For example, a trigger condition to transmit the reliability indication may be based on a reliability metric being above or below a (pre) configured threshold. A WTRU may transmit a reliability indication, for example, if/when one or more of the following conditions are satisfied: an average number of repetitions for successful MBS transport block reception within a preconfigured time interval meets (e.g., is above) a threshold, or, a different statistic, such as a median or a mode number of repetitions for successful MBS transport block reception within a preconfigured time interval meets (e.g., is above) a threshold; a minimum value of CQI associated with MBS reception over a preconfigured time interval meets (e.g., is below) a threshold; a ratio of a number of MBS transport block repetitions to the total number of MBS transport blocks within a preconfigured time interval meets (e.g., is above) a threshold; a number of transport blocks that failed successful reception (e.g., exceeded a maximum number of repetitions before successful decoding) meets (e.g., is above) a threshold; a statistic associated with MCH BLER within a time interval meets (e.g., is above) a threshold; a number of NACKs associated with MBS transport blocks counted by the WTRU within a time interval meets (e.g., is above) a threshold; an average MBS RSRP within a time interval meets (e.g., is below) a threshold; and/or an average MBS RSRQ within a time interval meets (e.g., is below) a threshold.

One or more reliability metrics (e.g., as described herein) may be measured specific to an MBS radio bearer. A WTRU may trigger a reliability indication at the end of a monitoring time interval. A WTRU may trigger a reliability indication if (e.g., as soon as) the evaluation criteria is met for one or more of the trigger conditions being monitored.

A reliability indication may be transmitted. There may be an association between a reliability metric and a UL resource. A WTRU may be (pre) configured with rules for the determination of UL resources to transmit a reliability indication. For example, the rules may be based on the value of a reliability metric or a range of the reliability metric. A WTRU may be configured with a plurality of UL resources. An UL resource may be mapped to a value of a reliability metric or a range thereof (e.g., each UL resource may be mapped to a respective value of a reliability metric or a range thereof). For example, a WTRU may be configured with a UL resource set for the transmission of a reliability indication and an association between a specific UL resource and a value of or range of the reliability metric. A WTRU may (e.g., if/when one or more of the trigger conditions are satisfied) select the UL resource associated with the value or range of the reliability metric, and, the WTRU may transmit the reliability indication, which may indicate a reliability indicator (e.g., the reliability metric and/or the reliability metric range).

In examples, the UL resource may be a random access (RA) resource. The terms RA resource and physical random access channel (PRACH) resource may be used interchangeably. An RA resource may refer to a time resource, a frequency resource, a spatial resource, a RACH occasion (RO), a preamble format, etc. Preamble format may be configured, for example, in terms of total preamble duration, sequence type, sequence length, guard time duration, length of cyclic prefix, etc.

There may be an association between a CQI index and an RA resource. A WTRU may be configured with a mapping between a CQI index (e.g., or a range thereof) and a preamble and/or a RACH occasion (e.g., a mapping between each respective CQI index and a respective preamble and/or a RACH occasion). A WTRU may be configured with a mapping between a CQI index (e.g., or a range thereof) and a PRACH configuration index that identifies the RA resource (e.g., a mapping between each respective CQI index and a respective PRACH configuration index that identifies a respective RA resource). A WTRU may determine a mapped RA resource (e.g., a preamble x and RACH occasion y) and transmit the preamble x in the RACH occasion y, for example, if/when a reliability indication is triggered, e.g., by a CQI value of n. RA resources may be specific to a CQI range (e.g., and may not be specific to a WTRU), which may reduce collisions and resource overhead.

In examples, a WTRU may be configured with an UL resource (e.g., only one UL resource) for a reliability indication. A WTRU may be configured to transmit a preamble on the resource, for example, if the CQI is lower than a (pre) configured threshold.

Different associations may be configured for different reliability metrics (e.g., similar to examples for CQI). A WTRU may be configured with a mapping between an RA resource and a statistic or value range associated with a number of repetitions for successful MBS transport block reception (e.g., over a time interval). A WTRU may be configured with a mapping between an RA resource and a ratio of a number of MBS transport block repetitions to a number (e.g., the total number) of MBS transport blocks (e.g., over a time interval). A WTRU may be configured with a mapping between an RA resource and a number of transport blocks that failed successful reception (e.g., over a time interval). A WTRU may be configured with a mapping between an RA resource and a statistic associated with MCH BLER (e.g., over a time interval). A WTRU may be configured with a mapping between an RA resource and a number of negative acknowledgement responses (NACKs) associated with MBS transport blocks (e.g., over a time interval). A WTRU may be configured with a mapping between an RA resource and a range of average MBS RSRP/RSRQ values (e.g., over a time interval).

A WTRU may be configured with an association between a respective trigger condition (e.g., with reference to a reliability indication based on one or more (pre) configured events) and a respective UL resource that may be specific to the respective trigger condition. A UL resource may identify (e.g., uniquely identify) a trigger condition.

A mapping between a reliability metric and a UL resource may be specific to an MBS service/MRB. For example, a WTRU may receive a plurality of reliability metric to RA resource associations. A WTRU may be configured, for example, so that RACH occasions are non-overlapping in time for simultaneous MBS services that the WTRU is configured for in an INACTIVE state.

A configuration related to mapping between a reliability metric and a UL resource may be applicable in multiple cells (e.g., all cells) within a logical area (e.g., MBS area, RAN area, and/or the like). A mapping may be configured to be valid with a current cell (e.g., only with a current cell). A WTRU may release a configuration, for example, based on (e.g., on a condition of) reselection to a different cell while in an INACTIVE state.

Different types of reliability indications may be provided (e.g., configured and/or sent) for different ranges of a reliability indicator (e.g., reliability metric). In examples, a WTRU may be configured with different actions based on the value or range of a reliability metric. A WTRU may perform a reliability indication procedure using (pre) configured RA resources, for example, if a reliability metric is within a first range. A WTRU may initiate a resume procedure, for example, if a reliability metric is within a second range. A WTRU may initiate a WTRU identity transmission procedure (e.g., the WTRU may transmit a unique WTRU identity associated with INACTIVE state), for example, if a reliability metric is within a second range. A WTRU may initiate a periodic RAN update procedure, for example, if the reliability metric is within a second range. In examples, the second range may be lower than the first range. In examples, the second range may correspond to a lower reliability than a reliability associated with the first range. In examples, a polling indication in an MCCH transmission may indicate whether a WTRU is to perform a reliability indication procedure and/or a resume procedure. In examples, a WTRU may be configured to monitor a plurality of reliability metrics and associated trigger conditions. A WTRU may be configured with different actions, e.g., based on a specific reliability metric(s) that satisfy the trigger condition(s). A WTRU may be configured with which action(s) is (are) applicable for a (e.g., each) configured reliability metric.

Handling associated with a random access response (RAR) associated with a reliability indication is disclosed herein. A WTRU may be configured to monitor for an RAR, e.g., after transmission of a reliability indication (e.g., a reliability indication that indicates a reliability indicator, such as a reliability metric). A WTRU may be configured to start an RA response window (e.g., ra-ResponseWindow) with a value associated with a reliability indication configuration, with a value configured as a part of RACH-Config-Common, or a default value, for example, if the WTRU transmitted a preamble preconfigured for a reliability indication and/or if the WTRU transmitted a preamble at an RO preconfigured for a reliability indication. In examples, a WTRU may be configured to monitor for an RNTI (e.g., a specific RNTI) to receive an RAR associated with a transmitted reliability indication. An RNTI (e.g., a specific RNTI) may be configured with a default RNTI, a (pre) configured RNTI, or may be configured relative (e.g., specific) to a multicast group. A WTRU may use RA-RNTI to monitor for RAR, for example, alternatively and/or in the absence of a configuration.

A WTRU may consider (e.g., determine) an RAR reception to be unsuccessful, for example, if an ra-ResponseWindow configured for a reliability indication expires and/or if the RAR including random access preamble identifier (RAPID) that matches the preamble associated with a reliability indication has not been received. A WTRU may consider an RAR reception to be unsuccessful, for example, if a valid downlink assignment has been received on the PDCCH for the RA-RNTI and/or if the RAR includes a MAC subPDU with a backoff indicator. A WTRU may retry transmission of a reliability indication, e.g., for a (pre) configured number of attempts. A WTRU may be configured to initiate a resume procedure, for example, if an RAR reception is unsuccessful, e.g., after a maximum number of attempts. A WTRU may be configured to initiate a resume procedure, e.g., request for transition from INACTIVE state to CONNECTED state. A WTRU may be configured with an access category for a resume procedure, for example, based on the MBS service type, e.g., as a part of an MBS configuration. The WTRU may initiate transmission of a RRCResumeRequest message. A WTRU may be configured to initiate an instance (e.g., a new instance) of a RACH procedure for the transmission of a RRCResumeRequest message.

A WTRU may consider an RAR reception to be successful, for example, if a valid downlink assignment has been received on the PDCCH for the RA-RNTI and/or a random-access response includes a MAC subPDU with a RAPID corresponding to the transmitted preamble for a reliability indication.

A WTRU may (e.g., if the RAR reception is successful) perform subsequent actions, e.g., based on the (e.g., content of the) MAC subPDU.

A WTRU may consider a reliability indication to be complete and go back to INACTIVE state, for example, if the WTRU receives a random access response that includes a MAC subPDU with a RAPID (e.g., only with a RAPID) and the RAPID corresponds to the transmitted preamble associated with a reliability indication. A WTRU may interpret an RAR with a RAPID field (e.g., only a RAPID field) as an indication (e.g., implicit indication) that the WTRU may continue actions according to an INACTIVE state and MBS configuration. A WTRU may assume that the NW does not need other (e.g., additional) information from the WTRU to support (e.g., ensure) QoS requirements for MBS delivery. In examples, a WTRU may be configured with an indication (e.g., explicit indication) in an RAR that a reliability indication procedure is complete. A WTRU may go back to the INACTIVE state and continue using the MBS configuration (e.g., based on the indication, e.g., explicit indication). An indication (e.g., explicit indication) may be part of a MAC sub-header (e.g., a field (e.g., new field) or a reserved field set to 1) and/or part of an RAR payload.

A WTRU may be configured to receive a random access response that includes a MAC subPDU with a RAPID field corresponding to a reliability indication and an associated RAR payload. An RAR payload format may be specific to a reliability indication. A reserved bit R in an RAR payload may be set (e.g., to 1) to indicate a different format. A timing advance field, UL grant field, and/or a temporary CRNTI field may be interpreted differently, e.g., if included in an RAR payload in response to a reliability indication. An RAR payload for a reliability indication response may include one or more of the following fields (e.g., with corresponding performance of WTRU actions): an indication of whether a WTRU is to initiate a resume procedure and/or an indication that the WTRU is to provide WTRU identity information.

A WTRU may be configured to initiate (e.g., or to not initiate) a resume procedure, for example, based on (e.g., on a condition of) receiving an indication (e.g., in an RAR payload) whether the WTRU is to initiate the resume procedure. A WTRU may receive an indication (e.g., whether to initiate a resume procedure), for example, if the network determines (e.g., based on a reliability indication) that the WTRU is to (e.g., needs to) enter CONNECTED state to meet a QoS requirement of an MBS service. A WTRU may initiate transmission of an RRCResumeRequest message.

A WTRU may be configured to provide a WTRU-specific identity to the network (e.g., the WTRU may transmit an I-RNTI), for example, based on an indication that the WTRU is to provide WTRU identity information. An I-RNTI value may be used to identify a suspended WTRU context of a WTRU in RRC_INACTIVE. A WTRU may be configured to transmit a truncated version of an I-RNTI (e.g., a shorter I-RNTI value). For example, a NW may determine (e.g., based on a reliability indication) that there is at least one WTRU with an associated reliability metric, but the exact number of WTRUs may be unclear. A NW may determine or be informed of the number of WTRUs, for example, to determine a scheduling strategy. For example, a NW may adopt or adapt a more conservative approach (e.g., conservative MCS and/or repetition) for group scheduling and/or a NW may move and/or transition WTRUs to a CONNECTED state for tighter control and feedback loop. A WTRU may transmit a WTRU-specific identity (e.g., I-RNTI), for example, to enable a NW to determine the number of WTRUs with a reliability metric or a range thereof (e.g., a specific reliability metric or a range thereof).

A WTRU may initiate a procedure, e.g., a procedure subsequent to or as an outcome of the reliability indication procedure. For example, such procedure may be a resume procedure or a procedure for a WTRU-specific transmission (e.g., as described herein). A WTRU may assume that an RAR received as a response to reliability indication is not WTRU-specific. A WTRU may ignore a timing advance and/or a UL grant received in an RAR (e.g., assumed not to be WTRU-specific). A WTRU may be configured to acquire UL resources using a RACH procedure (e.g., if/when the WTRU initiates the procedure). A WTRU may be configured (e.g., as part of the procedure) with the type of RACH procedure to use (e.g., a contention based or contention free, and/or a 2-step or 4-step RACH procedure). A WTRU may be configured to reset one or more variables associated with a RACH procedure. One or more variables may be modified, for example, due to a reliability indication transmission. A WTRU may (e.g., before transmitting a resume request message) reset variables specific to a RACH procedure including, for example, one or more of the following: the type of RACH procedure; a variable indicating a 2-stepRA or a 4-step-RA; a preamble transmission counter; a power ramping associated with a preamble transmission; a scaling factor for backoff; etc.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed:

1. A wireless transmit/receive unit (WTRU) associated with multicast broadcast service (MBS), comprising:
    a memory; and
    a processor configured to:
    send, in a radio resource control (RRC) connected state, an indication of an interest to receive an MBS service;
    receive RRC release information comprising one or more MBS reference signal received quality (RSRQ) thresholds, wherein the RRC release information further indicates that multicast service reception is allowed for the WTRU in an RRC inactive state;
    enter the RRC inactive state based on the RRC release information;
    determine, in the RRC inactive state, an RSRQ value for a serving cell; and
    initiate an RRC connection resumption procedure based on the RSRQ value for the serving cell and the one or more MBS RSRQ thresholds, wherein the processor is configured to send an RRC resumption request that indicates a resume cause associated with the initiation of the RRC connection resumption procedure.

2. The WTRU of claim 1, wherein the processor is further configured to:
    determine that the RSRQ value for the serving cell is lower than an MBS RSRQ threshold of the one or more MBS RSRQ thresholds, wherein the RRC connection resumption procedure is initiated based on the determination that the RSRQ value for the serving cell is lower than the MBS RSRQ threshold.

3. The WTRU of claim 1, wherein the processor is further configured to:
    receive one or more MBS reference signal received power (RSRP) thresholds;
    determine, in the RRC inactive state, an RSRP value for the serving cell; and
    determine that the RSRP value for the serving cell is lower than an MBS RSRP threshold of the one or more MBS RSRP thresholds, wherein the RRC connection resumption procedure is initiated further based on the determination that the RSRP value for the serving cell is lower than the MBS RSRP threshold.

4. The WTRU of claim 1, wherein the processor is further configured to receive MBS configuration information associated with the RRC inactive state.

5. The WTRU of claim 4, wherein the MBS configuration information is received after the RRC release information is received.

6. The WTRU of claim 4, wherein the RRC release information indicates the MBS configuration information.

7. The WTRU of claim 1, wherein the processor is further configured to receive an RRC Resume message that indicates to the WTRU to switch from the RRC inactive state to an RRC connected state.

8. The WTRU of claim 1, wherein the resume cause is set to be "mbs-call-interest".

9. The WTRU of claim 1, wherein the RRC release information is received in the RRC connected state.

10. The WTRU of claim 1, wherein the processor is further configured to receive, in the RRC inactive state, a multicast transmission associated with an MBS session, and the serving cell is associated with the MBS session.

11. A method performed by a wireless transmit/receive unit (WTRU) associated with multicast broadcast service (MBS), comprising:
- sending, in a radio resource control (RRC) connected state, an indication of an interest to receive an MBS service;
- receiving RRC release information comprising one or more MBS reference signal received quality (RSRQ) thresholds, wherein the RRC release information further indicates that multicast service reception is allowed for the WTRU in an RRC inactive state;
- entering the RRC inactive state based on the RRC release information;
- determining, in the RRC inactive state, an RSRQ value for a serving cell; and
- initiating an RRC connection resumption procedure based on the RSRQ value for the serving cell and the one or more MBS RSRQ thresholds, wherein the method further comprises sending an RRC resumption request that indicates a resume cause associated with the initiation of the RRC connection resumption procedure.

12. The method of claim 11, further comprising:
- determining that the RSRQ value for the serving cell is lower than an MBS RSRQ threshold of the one or more MBS RSRQ thresholds, wherein the RRC connection resumption procedure is initiated based on the determination that the RSRQ value for the serving cell is lower than the MBS RSRQ threshold.

13. The method of claim 11, further comprising:
- receiving one or more MBS reference signal received power (RSRP) thresholds;
- determining, in the RRC inactive state, an RSRP value for the serving cell; and
- determining that the RSRP value for the serving cell is lower than an MBS RSRP threshold of the one or more MBS RSRP thresholds, wherein the RRC connection resumption procedure is initiated further based on the determination that the RSRP value for the serving cell is lower than the MBS RSRP threshold.

14. The method of claim 11, further comprising receiving MBS configuration information associated with the RRC inactive state.

15. The method of claim 14, wherein the MBS configuration information is received after the RRC release information is received.

16. The method of claim 14, wherein the RRC release information indicates the MBS configuration information.

17. The method of claim 11, further comprising receiving an RRC Resume message that indicates to the WTRU to switch from the RRC inactive state to an RRC connected state.

18. The method of claim 11, wherein the resume cause is set to be "mbs-call-interest".

19. The method of claim 11, further comprising:
- receiving a multicast control channel (MCCH) transmission during a first MCCH modification period, wherein the MCCH transmission comprises a polling request for an indication of the RSRQ value; and
- performing measurements during a second MCCH modification period based on the received MCCH transmission, wherein the second MCCH modification period is subsequent in time to the first MCCH modification period, and wherein the RSRQ value is determined based on the measurements during the second MCCH modification period.

* * * * *